(12) United States Patent
Yoo et al.

(10) Patent No.: US 10,210,639 B2
(45) Date of Patent: Feb. 19, 2019

(54) METHOD AND APPARATUS FOR TILE-BASED RENDERING

(71) Applicant: SAMSUNG ELECTRONICS CO., LTD., Suwon-si (KR)

(72) Inventors: Jeongjoon Yoo, Hwaseong-si (KR); Krishnadasan Sundeep, Karnataka (IN)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 318 days.

(21) Appl. No.: 15/075,529

(22) Filed: Mar. 21, 2016

(65) Prior Publication Data

US 2016/0275710 A1   Sep. 22, 2016

(30) Foreign Application Priority Data

Mar. 20, 2015 (IN) .......................... 1422/CHE/2015
Jan. 6, 2016 (KR) ........................ 10-2016-0001614

(51) Int. Cl.
| | | |
|---|---|---|
| *G06T 11/60* | (2006.01) | |
| *G06K 9/62* | (2006.01) | |
| *G06T 7/60* | (2017.01) | |
| *G06T 11/20* | (2006.01) | |
| *G06T 11/40* | (2006.01) | |

(52) U.S. Cl.
CPC ............ *G06T 11/60* (2013.01); *G06K 9/6267* (2013.01); *G06T 7/60* (2013.01); *G06T 11/203* (2013.01); *G06T 11/40* (2013.01)

(58) Field of Classification Search
None
See application file for complete search history.

(56) References Cited

U.S. PATENT DOCUMENTS

| | | |
|---|---|---|
| 6,784,884 B1 | 8/2004 | Hsieh |
| 6,798,410 B1 | 9/2004 | Redshaw et al. |
| 2008/0018664 A1 | 1/2008 | Min et al. |
| 2011/0261059 A1 | 10/2011 | Keall et al. |
| 2011/0285711 A1* | 11/2011 | Kilgard ................ G06T 11/203 345/426 |

(Continued)

FOREIGN PATENT DOCUMENTS

| | | |
|---|---|---|
| JP | 3367506 B2 | 11/2002 |
| JP | 5172640 B2 | 1/2013 |
| KR | 10-0762811 B1 | 10/2007 |

OTHER PUBLICATIONS

Loop, Charles, et al. "Resolution Independent Curve Rendering Using Programmable Graphics Hardware." ACM Transactions on Graphics (TOG)., p. 1000-1009, vol. 24. No. 3. ACM, 2005. (10 pages in English).

(Continued)

*Primary Examiner* — Yingchun He
(74) *Attorney, Agent, or Firm* — F. Chau & Associates, LLC

(57) ABSTRACT

A method and apparatus of performing tile-based rendering is provided. The method of performing tile-based rendering includes calculating parameters related to a Bezier curve included in an object, by using geometric information of the object, classifying tiles included in a frame based on the parameters, and performing the tile-based rendering based on the classifying of the tiles.

30 Claims, 14 Drawing Sheets

(56) References Cited

U.S. PATENT DOCUMENTS

2014/0015838 A1   1/2014  Yoo et al.
2014/0176544 A1*  6/2014  Fishwick ............... G06T 15/10
                                                    345/423

OTHER PUBLICATIONS

Extended European Search Report dated Sep. 9, 2016 in counterpart European Application No. 16161225.4. (10 pages in English).

* cited by examiner

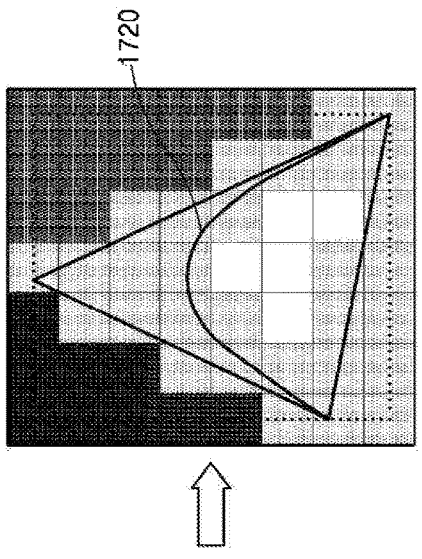
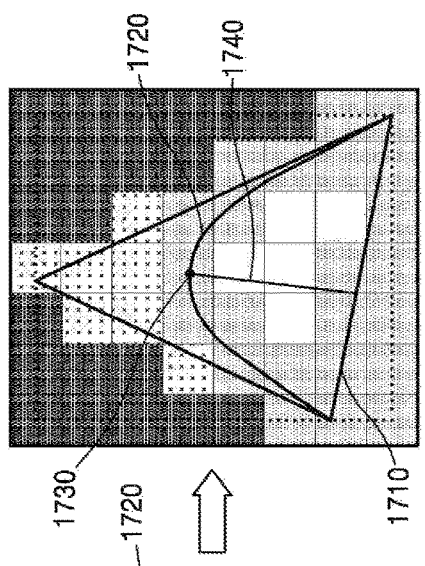
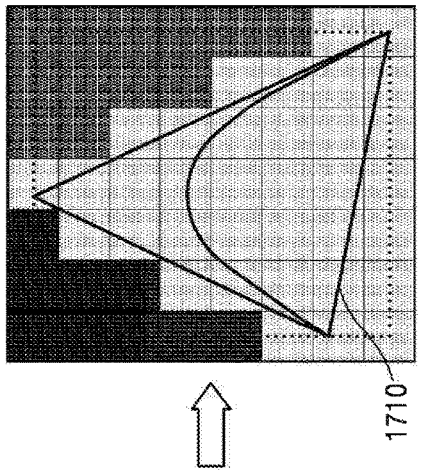
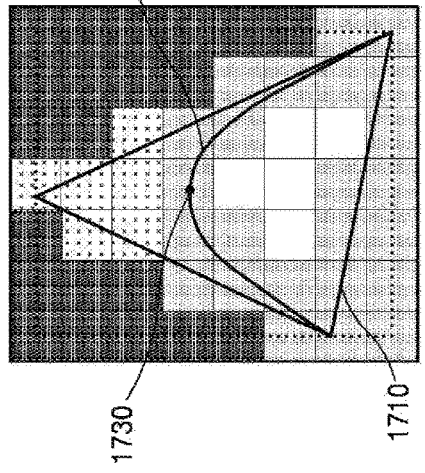
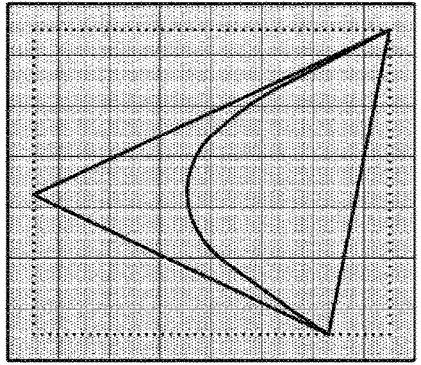

METHOD AND APPARATUS FOR TILE-BASED RENDERING

CROSS-REFERENCE TO RELATED APPLICATION

This application claims the benefits under 35 USC § 119(a) of Korean Patent Application No. 10-2016-001614, filed on Jan. 6, 2016, in the Korean Intellectual Property Office, and Indian Patent Application No. 1422/CHE/2015, filed on Mar. 20, 2015, in the Indian Patent Office, the entire disclosures of which are incorporated herein by reference for all purposes.

BACKGROUND

1. Field

The following description relates to a method and apparatus for performing tile-based rendering.

2. Description of the Related Art

A method of improving acceleration performance of a graphics processing unit (GPU) when vector graphics or path rendering is performed has been researched. A hardware structure of the GPU is designed such that all input data are triangles to accelerate three-dimensional graphics. However, for rendering a path, the input data is not a triangle, but is a combination of commands and vertexes. Accordingly, it is difficult to improve the acceleration performance of the GPU when path rendering is performed.

For example, to draw a curve using the GPU, a central processing unit (CPU) divides a curve into a plurality of triangles with respect to a start point of the curve and instructs the GPU to reconstruct the divided triangles into a curve using an OpenGL API. Accordingly, substantial time is consumed by the CPU to divide a curve into a plurality of triangles. Furthermore, communication with the GPU is required whenever many OpenGL APIs are called, and many state changes are generated by the GPU.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing tile-based rendering, the method including calculating, using geometric information of an object, parameters related to a Bezier curve in the object, classifying tiles included in a frame based on the parameters, and performing the tile-based rendering based on the classifying of the tiles.

The parameters may include at least one of a bounding box, a convex hull, Loop-Blinn data corresponding to the Bezier curve, and an extreme point corresponding to the Bezier curve, or a line connected from the extreme point to the convex hull.

The classifying of the tiles may include classifying as a first position indicia at least one tile included in the frame having all endpoints corresponding to corners of the tile located outside a convex hull corresponding to the Bezier curve.

The classifying of the tiles may include determining tiles having some endpoints corresponding to corners of the tile located inside a convex hull corresponding to the Bezier curve, performing a Loop-Blinn test on each of the determined tile, and classifying the determined tiles based on the Loop-Blinn test.

The classifying of the determined tiles may include identifying, based on the Loop-Blinn test, at least one tile having all endpoints located inside the convex hull and the Bezier curve, and classifying the identified at least one tile as a second position indicia.

The classifying of the determined tiles may include identifying, based on the Loop-Blinn test, at least one tile having all endpoints located outside the Bezier curve, and classifying the identified at least one tile as a third position indicia.

The identifying of the at least one tile may include identifying the at least one tile in which an x coordinate value of an extreme point of the Bezier curve is less than an intermediate control point of the Bezier curve and x coordinate values of the endpoints corresponding to corners of the tile.

The identifying of the at least one tile may include identifying the at least one tile in which an x coordinate value of an extreme point of the Bezier curve is greater than an intermediate control point of the Bezier curve and x coordinate values of the endpoints corresponding to corners of the tile.

The identifying of the at least one tile may include identifying at least one tile located at one side of a line connected from an extreme point of the Bezier curve to the convex hull.

The classifying of the determined tiles may include identifying, based on the Loop-Blinn test, tiles having some endpoints corresponding to the corners of the tile located inside the Bezier curve, classifying the identified at least one tile as a fourth position indicia, dividing the tile classified as the fourth position indicia into a plurality of sub-tiles, and classifying the sub-tiles using endpoints corresponding to corners of each of the sub-tiles.

The performing of the tile-based rendering may include generating a position indicia list corresponding to each of the tiles included in the frame based on the classifying of the tiles.

The performing of the tile-based rendering may include identifying a tile located inside the Bezier curve based on a position indicia list corresponding to each of the tiles including the frame, and performing the tile-based rendering on each fragment of the identified tile.

The performing of the tile-based rendering may include identifying a tile located outside the Bezier curve based on a position indicia list corresponding to each of the tiles including the frame, and not performing the tile-based rendering on fragments of the identified tile.

The performing of the tile-based rendering may include identifying a tile located partially inside the Bezier curve based on a position indicia list corresponding to each of the tiles including the frame, performing a Loop-Blinn test on each fragment of the identified tile, classifying the fragments located inside the Bezier curve and fragments located outside the Bezier curve based on the Loop-Blinn test, and performing the tile-based rendering on the identified tile based the classifying of the fragments.

In another general aspect, there is provided an apparatus for performing tile-based rendering, the apparatus including a preprocessor configured to calculate parameters related to a Bezier curve in an object, using geometric information of the object, a classifier configured to classify tiles included in a frame, based on the parameters, and a renderer configured to perform the tile-based rendering based on the classifying of the tiles.

The parameters may include at least one of a bounding box, a convex hull, Loop-Blinn data corresponding to the Bezier curve, and an extreme point corresponding to the Bezier curve, or a line connected from the extreme point to the convex hull.

The classifier may be configured to classify as a first position indicia at least one tile included in the frame having all endpoints corresponding to corners of the tile located outside a convex hull corresponding to the Bezier curve.

The classifier may be configured to determine tiles having some endpoints corresponding to corners of the tile located inside a convex hull corresponding to the Bezier curve, to perform a Loop-Blinn test on each of the determined tiles, and to classify the determined tiles based on the Loop-Blinn test.

The classifier may be configured to identify, based on the result of the Loop-Blinn test, at least one tile having all endpoints located inside the convex hull and the Bezier curve and to classify the identified at least one tile as a second position indicia.

The classifier may be configured to identify, based on the result of the Loop-Blinn test, at least one tile having all endpoints located outside the Bezier curve, and to classify the identified at least one tile as a third position indicia.

The classifier may be configured to identify at least one tile in which an x coordinate value of an extreme point of the Bezier curve is less than an intermediate control point of the Bezier curve and x coordinate values of the endpoints corresponding to corners of the tile.

The classifier may be configured to identify at least one tile in which an x coordinate value of an extreme point of the Bezier curve is greater than an intermediate control point of the Bezier curve and x coordinate values of the endpoints corresponding to corners of the tile.

The classifier may be further configured to identify at least one tile located at one side of a line connected from an extreme point of the Bezier curve to the convex hull.

The apparatus of claim 19, wherein the classifier may be configured to identify, based on the result of the Loop-Blinn test, tiles having some endpoints corresponding to the corners of the tile located inside the Bezier curve, classify the identified at least one tile as a fourth position indicia, divide the tile classified as the fourth position indicia into a plurality of sub-tiles, and classify the sub-tiles using endpoints corresponding to corners of each of the sub-tiles.

The renderer may be configured to generates a position indicia list corresponding to each of the tiles included in the frame based on the classifying of the tiles.

The renderer may be configured to identify a tile located inside the Bezier curve based on a position indicia list corresponding to each of the tiles including the frame, and to perform the tile-based rendering on each of fragments of the identified tile.

The renderer may be configured to identify a tile located outside the Bezier curve based on a position indicia list corresponding to each of the tiles including the frame, and to not perform the tile-based rendering on fragments of the identified tile.

The renderer may be configured to identify a tile located partially inside the Bezier curve based on a position indicia list corresponding to each of the tiles included in the frame, to perform a Loop-Blinn test on each of fragments of the identified tile, to classify the fragments into fragments located inside the Bezier curve or fragments located outside the Bezier curve, based on the Loop-Blinn test, and to perform the tile-based rendering on the identified tile based on the classifying of the fragments.

The apparatus may include a graphics processing unit (GPU).

In another general aspect, there is provided a method of performing tile-based rendering, the method including receiving parameters related to a Bezier curve of an object, determining whether all endpoints of tiles included in a frame are located outside a convex hull corresponding to the Bezier curve, and exclude rendering of fragments in a tile, in response to all endpoints of the tile being located outside the convex hull.

The method may include performing a Loop-Blinn test on a tile, in response to at least one endpoint of the tile intersecting the convex hull, classifying the tile as an inside tile, in response to identifying the tile having all endpoints located inside the convex hull and the Bezier curve, and performing the tile-based rendering on each of fragments of the inside tile.

The method may include performing a Loop-Blinn test on a tile, in response to at least one endpoint of the tile intersecting the convex hull, dividing a tile into sub-tiles, in response to identifying the tile having some endpoints located inside the Bezier curve, and classifying each sub-tile from the sub-tiles as one of inside, outside, or the partially inside the Bezier curve.

Other features and aspects will be apparent from the following detailed description, the drawings, and the claims.

BRIEF DESCRIPTION OF THE DRAWINGS

FIGS. 17A to 17E are diagrams illustrating examples of performing tile-based rendering.

Figure 1:
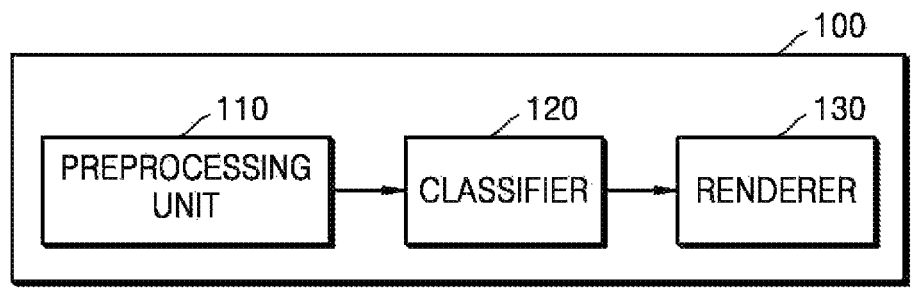
FIG. 1 is a diagram illustrating an example of a rendering apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below depending on a particular direction of the figures. The device may be otherwise oriented (rotated 90 degrees or at other orientations) and the spatially relative descriptors used herein may be interpreted accordingly.

FIG. 1 is a diagram illustrating an example of a rendering apparatus 100.

Referring to FIG. 1, the rendering apparatus 100 includes a preprocessing unit (or a preprocessor) 110, a classifier 120, and a renderer 130.

In an example, the rendering apparatus 100 performs tile-based rendering on a Bezier curve. The rendering apparatus 100 may selectively perform tests on endpoints of a tile. Accordingly, the rendering apparatus 100 may reduce computational power consumed for performing rendering so that optimal tile binning may be performed. The endpoint denotes a point corresponding to a corner of a tile. For example, when a tile has a rectangular shape, the tile has four endpoints.

The rendering apparatus 100 determines whether all endpoints of a tile are located inside the Bezier curve or outside the Bezier curve by using implicit equation methods such as, for example, a Loop-Blinn test, a maximum/minimum test, and a line test. The rendering apparatus 100 may divide each of the tiles included in a frame into a plurality of sub-tiles based on the size of a tile. The Loop-Blinn test denotes a test based on the content of an article entitled "Resolution Independent Curve Rendering using Programmable Graphics Hardware" co-authored by Charles Loop and Jim Blinn.

The All documents cited in the present disclosure, including published documents, patent applications, and patents, may be incorporated herein in their entirety by reference in the same manner as when each cited document is separately and specifically incorporated or incorporated in its entirety.

In an example, the rendering apparatus 100 calculates parameters related to the Bezier curve. The Bezier curve may be acquired using geometric information of an object, on which rendering is performed, received from an external apparatus (not shown). The rendering apparatus 100 may classify the tiles included in a frame into a tile located inside the Bezier curve (hereinafter, referred to as an inside tile), a tile located outside the Bezier curve (hereinafter, referred to as an outside tile), or a tile partially located inside the Bezier curve (hereinafter, referred to as a partially inside tile), based on the calculated parameters. The rendering apparatus 100 may perform tile-based rendering on the Bezier curve based on a result of the classification.

Vector graphics data may be stored in a memory (not shown). Furthermore, the vector graphics data may be manipulated as one or more objects formed by geometric primitives. The geometric primitives, for example, points, lines, polygons, Bezier curves, or text characters may be based on mathematical equations representing parts of the vector graphics data in a digital image. The objects may be located in a two-dimensional (2D) or three-dimensional (3D) space. To render vector graphics on raster-based image apparatuses, for example, display apparatuses or printers, the objects are transformed into raster graphics data according to a process that is so-called rasterization.

One type of an object generally used in image models is the Bezier curve. A quadratic Bezier curve is one type of Bezier curve. The Bezier curve is defined by three control points "a", "b", and "c" on a 2D plane or in a 3D space. The Bezier curve starts from a control point "a" and ends at a control point "c". Furthermore, the shape of the Bezier curve is affected by the position of a control point "b". A rational quadratic Bezier curve is a quadratic Bezier curve defined by a rational fraction of a $2^{nd}$ order polynomial. A conic Bezier curve is a Bezier curve having a shape of an oval, a parabola, or a hyperbola. A general quadratic Bezier curve is a special case of a conic Bezier curve. The quadratic Bezier curve may be expressed by Mathematical Formula 1 defined by a variable "t".

$$a*(1-t)^2+b*t*(1-t)+c*t^2, 0 \leq t \leq 1 \qquad \text{[Mathematical Formula 1]}$$

In Mathematical Formula 1, "a," "b," and "c" denote control points of the Bezier curve.

A tile-based rendering system is one of the typical methods of rendering tiles in vector graphics. According to the tile-based rendering system, a frame buffer (not shown) is divided by the same size as the sizes of tiles and scene geometry is rendered for each tile. For example, the tile-based rendering system may perform tile-based rendering pipeline. The tile-based rendering pipeline may include a binning process of taking each primitive such as a triangle or a curve and placing the primitive on a tile where the primitives intersect with each other. After the binning process, it is checked which tiles curves or primitives intersect with each other and rendering is performed only on the tiles. In a method of rendering tiles in the vector graphics, a renderer for performing pixel check on each fragment is needed, which consumes excessive computational power. In other words, the renderer checks individual fragment to determine whether a fragment of a particular tile is located inside the Bezier curve or outside the Bezier curve.

The rendering apparatus 100 performs an optimal process using implicit functions by replacing a check performed on all points in a scene with a check performed on tiles. For example, the rendering apparatus 100 identifies tiles located inside or outside the Bezier curve and performs a per-pixel Loop-Blinn test only on the identified tiles. In other words, the rendering apparatus 100 does not perform the Loop-Blinn test on all pixels in a scene. The rendering apparatus 100 performs the per-pixel Loop-Blinn test only on tiles that are not classified such that the entire area of a tile is located inside or outside the Bezier curve. Accordingly, computational power consumed during the tile-based rendering is reduced, and the rendering apparatus 100 generates a plurality of bounding boxes and performs binning on the bounding boxes. The rendering apparatus 100 performs binning on the Bezier curve not just for a stroke of the Bezier curve, i.e., drawing an outline, but for filling the inside of the Bezier curve. In other words, the rendering apparatus 100 may set a color to the inside of the Bezier curve.

Figure 2:
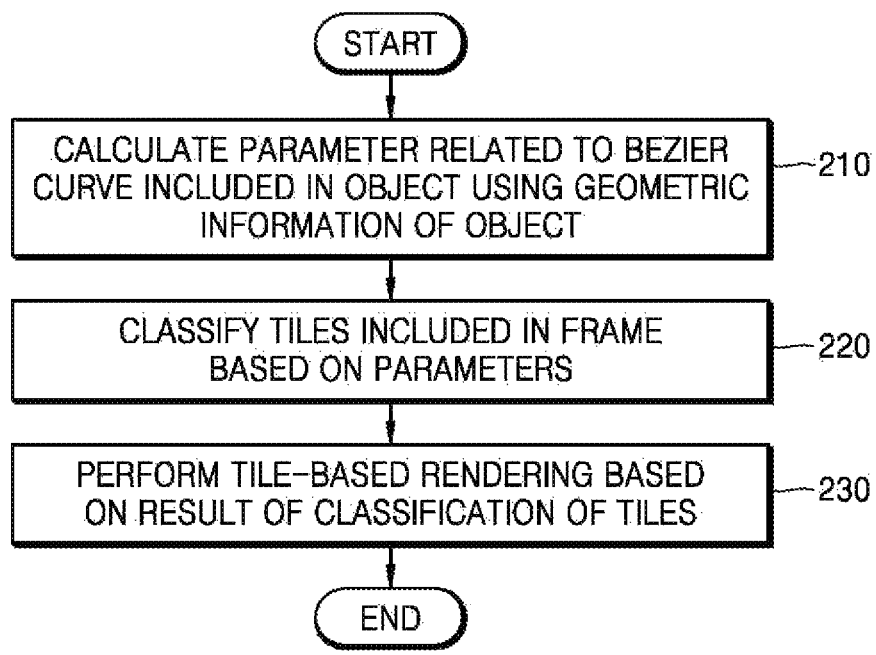
FIG. 2 is a diagram illustrating an example of a method of performing tile-based rendering.

FIG. 2 is a diagram illustrating an example of a method of performing tile-based rendering. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. The above descriptions of FIG. 1, is also applicable to FIG. 2, and is incorporated herein by reference. Thus, the above description may not be repeated here.

Referring to FIG. 2, a method of performing tile-based rendering may include processes that are time-serially processed by the rendering apparatus 100 of FIG. 1. In 210, the preprocessing unit 110 calculates a parameter related to the Bezier curve included in an object using geometric information of the object. In an example, the rendering apparatus 100 receives geometric information of an object from an external apparatus. Examples of a parameter related to the Bezier curve may include a bounding box, a convex hull, Loop-Blinn data corresponding to the Bezier curve, an extreme point corresponding to the Bezier curve, or a line connected from an extreme point to a convex hull.

A Bezier curve and a parameter related to the Bezier curve are described below with reference to FIGS. 3A to 5.

Figure 3A:
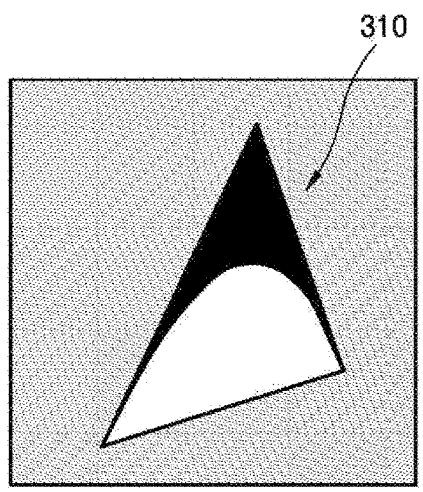
FIGS. 3A and 3B are diagrams illustrating examples of Bezier curves.
Figure 3B:
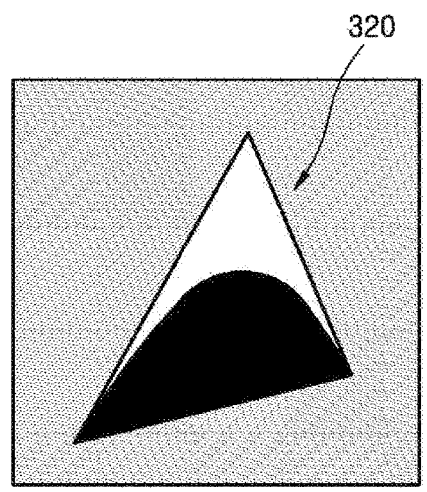

FIGS. 3A and 3B illustrate examples of Bezier curves 310 and 320.

FIG. 3A illustrates an example of the Bezier curve 310 in which a concave area of the Bezier curve 310 is filled. FIG. 3B illustrates an example of the Bezier curve 320 in which a convex area of the Bezier curve 320 is filled.

As illustrated in FIGS. 3A and 3B, the Bezier curve may be a parametric curve that is frequently used in a computer graphics and other related fields. In the vector graphics, Bezier curves are used for modeling a smooth curve that may be infinitely extended. In image manipulation programs, a "path" is generally represented by a combination of Bezier curves connected to each other. The Bezier curve is defined by the control points. In 2D content of a path rendering, each control point is located at a 2D point. Curved segments included in a path may be generated by a path command with respect to a quadratic Bezier curve. A process of filling the Bezier curve is important in the vector graphics rendering. A path rendering process is a resolution-independent method. In other words, a scene is independent of a pixel resolution of the frame buffer and is illustrated by paths. In the path rendering, a 2D image or scene, as illustrated in FIGS. 3A and 3B, are determined by a sequence of paths. Each of the paths is determined by an arrangement of path commands and a set of scalar coordinates corresponding to the arrangement. The path rendering is similar to a process of drawing performed by an artist using a pen or a brush. A path may include a combination of sub-paths. Each of the sub-paths, that is, a trajectory, is an arrangement of line segments and/or curve segments connected to each other. In an example, each sub-path may be closed. In other words, as a stroke forms a loop, a start point and an end point of a sub-path may be the same point. In another example, a sub-path may be open. In other words, the start point and the end point of a sub-path may be different points.

When a particular path is rendered, the path may be stroked, filled, or stroked and filled. As illustrated in FIGS. 3A and 3B, paths forming a scene may be filled out. In general, a stroking process is performed just after a filling process is performed, like stroking an outline of a filled area. The filling process signifies a process of setting colors to pixels located at the "inside" of closed sub-paths of a path or coloring the "inside". The filling processing is similar to a process in which a child "colors between lines on a drawing paper".

The rendering apparatus 100 fills the Bezier curve according to a method known by those skilled in the art. For example, the rendering apparatus 100 may fill the Bezier curve in a "standard-fill" method or a "scan-line" method.

Figure 4:
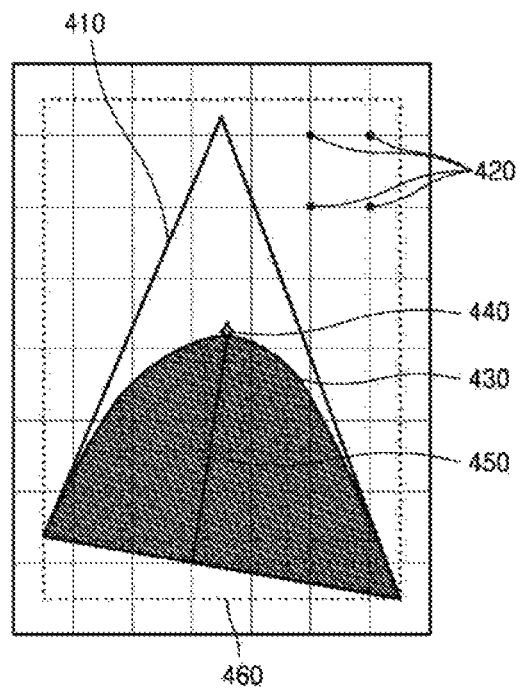
FIG. 4 is a diagram illustrating examples of parameters related to a Bezier curve.

FIG. 4 illustrates examples of parameters related to the Bezier curve. As illustrated in FIG. 4, graphic image data may be divided into tiles having the same size including four endpoints 420. A convex hull 410 is formed by three lines connecting three control points of a Bezier curve 430 that is a quadratic curve. The convex hull 410 is defined by boundaries of intersections of all convex sets. All convex sets may include intersections or all vertexes of half spaces. The half spaces take three vertexes at one time to form a plane, and are generated with other vertexes. The Bezier curve 430 is entirely included in the convex hull 410. The quadratic Bezier curve 430 that is a quadratic Bezier curve may be expressed by Mathematical Formula 2 that is defined by a variable "t".

$$a*(1-t)^2 + b*t*(1-t) + c*t^2, 0 \leq t \leq 1 \qquad \text{[Mathematical Formula 2]}$$

In Mathematical Formula 2, "a," "b," and "c" denote control points of the Bezier curve 430.

The Bezier curve 430 is determined by the control points arranged clockwise. Furthermore, a Loop-Blinn parameter of the Bezier curve 430 may include (0, 0), (0, 0.5), and (1, 1).

Furthermore, an extreme point 440 of the Bezier curve 430 is acquired by differentiating the Bezier equation 430 as shown in Mathematical Formulae 3 and 4.

$$a*(1-t)^2 + b*t*(1-t) + c*t^2 \qquad \text{[Mathematical Formula 3]}$$

$$-2*a*(1-t) + b*(1-t) - b*(t) + 2*c*t \qquad \text{[Mathematical Formula 4]}$$

In order to acquire the extreme point 440, Mathematical Formula 4 is converged to 0, and an equation is obtained as Mathematical Formula 5.

$$t = (b-c)/(2*b-c-a) \qquad \text{[Mathematical Formula 5]}$$

According to Mathematical Formula 5, two extreme points on the Bezier curve 430 are acquired, one is in an x-axis direction and the other one is in a y-axis direction. The extreme point 440 that is effective has a range of 0≤t<1.

Furthermore, a line 450, where the extreme point 440 meets any one point on a line, i.e., a base, connecting a start point and an end point of the Bezier curve 430, is generated. For example, assuming that the control points of the Bezier curve 430 are "a", "b", and "c" the top point of the line 450 corresponds to the extreme point 440. Furthermore, the bottom point of the line 450 corresponds to any one point of a line connected from the control point "a" to the control point "c". As illustrated in FIG. 4, the line 450 is generated by connecting the extreme point 440 of the Bezier curve 430 to any one point on the base of the Bezier curve 430.

The bounding box 460 is set from the minimum value and the maximum value of the control points by using a general method known by those skilled in the art. For example, a control point triangle of the Bezier curve 430, i.e., the convex hull 410, is binned after finding maxY and minY. The maxY and the minY correspond to any one of the control points of the Bezier curve 430. According to the range in a y-axis direction, scan lines and a horizontal span are generated to bin the convex hull 410 of the Bezier curve 430. Intersecting tiles are acquired as 1 (bin) from the ranges. However, the bounding box 460 may be set by other methods known by those skilled in the art.

Referring back to FIG. 2, in 220, the classifier 120 classifies tiles included in a frame based on parameters. The classifier 120 classifies tiles included in a frame by using the parameters calculated by the preprocessing unit 110.

For example, the classifier 120 classifies at least one of tiles included in a frame, the tiles having all endpoints located outside the convex hull 410, as a first position indicia. The endpoints denote points corresponding to the corners of a tile.

Furthermore, the classifier 120 determines tiles having some endpoints located inside a convex hull, among the tiles included in a frame. The classifier 120 performs a Loop-Blinn test on the determined tiles and classifies the tiles based on a result of the Loop-Blinn test.

When all endpoints of a tile are determined to be located inside a convex hull and the Bezier curve according to the result of the Loop-Blinn test, the classifier 120 classifies the tile as a second position indicia. When all endpoints of a tile are determined to be located outside the Bezier curve according to the result of the Loop-Blinn test, the classifier 120 classifies the tile as a third position indicia. When some endpoints of a tile are determined to be located inside the Bezier curve according to the result of the Loop-Blinn test, the classifier 120 classifies the tile as a fourth position indicia.

Figure 5:
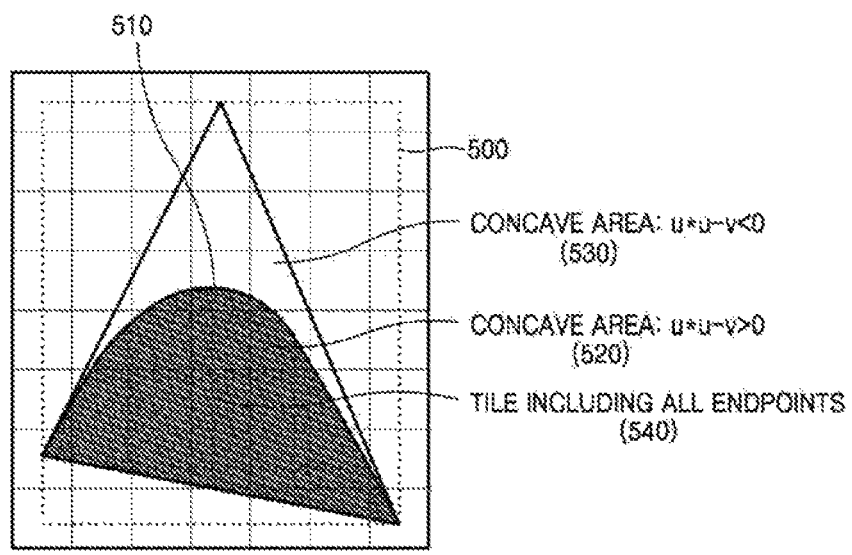
FIG. 5 is a diagram illustrating examples of an implicit equation method.

FIG. 5 illustrates examples of an implicit equation method. Referring to FIG. 5, an internal area of a Bezier curve 510 is referred to as a convex area 520 and may be defined by Mathematical Formula 6.

$$u*u-v>0 \qquad \text{[Mathematical Formula 6]}$$

The classifier 120 determines tiles 540 having all endpoints located inside the convex area 520, among tiles included in a frame, and indicates the tiles 540 as inside tiles. Similarly, an outer area of the Bezier curve 510 may be referred to as a concave area 530, and may be defined by Mathematical Formula 7.

$$u*u-v<0 \qquad \text{[Mathematical Formula 7]}$$

In Mathematical Formulae 6 and 7, "u" and "v" are defined by the Loop-Blinn test. For example, the "u" and "v" may be (0, 0), (0, 0.5), and (1, 1), but the present disclosure is not limited thereto. The "u" and "v" denote intermediate values, which may be acquired by performing interpolation of a convex hull, such as, for example, the "u" and "v" may be acquired by a barycentric interpolation method.

The classifier 120 indicates tiles included in the frame 500, the tiles having all endpoints located outside the concave area 530, as outside tiles.

The inner area of the Bezier curve 510 is defined to be the convex area 520. If all endpoints of a tile are included in a convex area, the tile is located inside the Bezier curve 510.

Tiles located outside the extreme point of the Bezier curve 510 are considered to be located outside the Bezier curve 510.

A tile having all endpoints located outside the Bezier curve 510 does not intersect the Bezier curve 510 without meeting the line connecting the extreme point of the Bezier curve 510 and the base of a convex hull.

Referring back to FIG. 2, in 230, the renderer 130 performs tile-based rendering on tiles based on a result of the classification.

Figure 6:
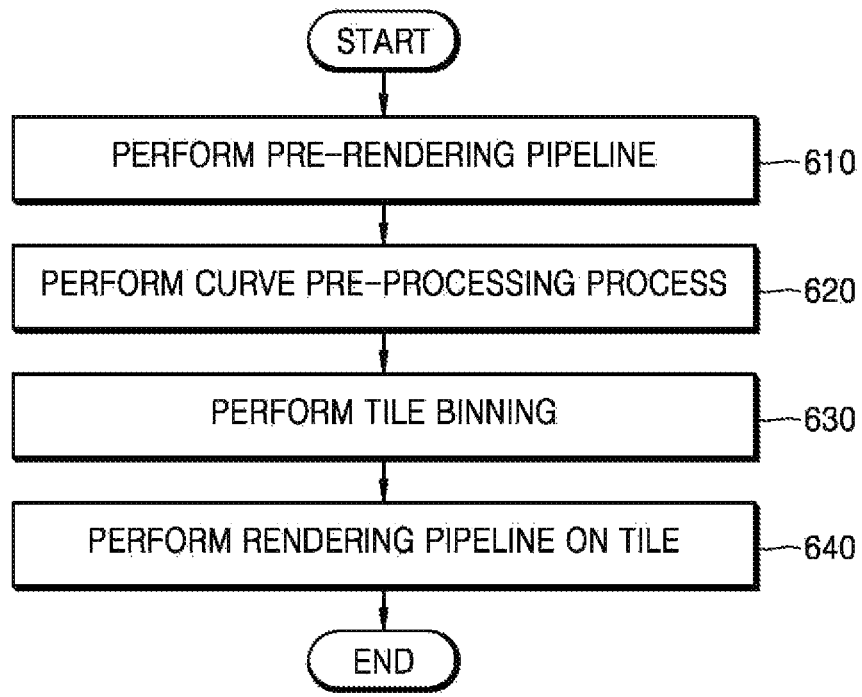
FIG. 6 is a is a diagram illustrating an example of a method of performing tile-based rendering.

FIG. 6 is a diagram illustrating another example of a method of performing tile-based rendering. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. The above descriptions of FIGS. 1-5, is also applicable to FIG. 6, and is incorporated herein by reference. Thus, the above description may not be repeated here.

Referring to FIG. 6, a method of performing tile-based rendering may include processes that are time-serially processed by the rendering apparatus 100 of FIG. 1.

In 610, the rendering apparatus 100 performs pre-rendering pipeline on the Bezier curve. The pre-rendering pipeline may include a process of receiving information about the Bezier curve. In other words, the pre-rendering pipeline may include a process of receiving geometric information of an object from the external apparatus.

In 620, the rendering apparatus 100 performs a curve pre-processing process. In other words, the preprocessing unit 110 calculates a parameter related to the Bezier curve. The parameter related to the Bezier curve may include the bounding box 460, the convex hull 410, the Loop-Blinn parameter, the extreme point 440, or the line 450 connecting from the extreme point 440 to the base of the convex hull 410, which are described with reference to FIG. 4.

In 630, the rendering apparatus 100 performs tile binning. In other words, the classifier 120 classifies tiles of the frame buffer into an inside tile or an outside tile using various tests described later.

In 640, the rendering apparatus 100 performs rendering pipeline on tiles. In other words, the renderer 130 renders the Bezier curve or primitives, which intersect tiles, by using the parameters calculated during the tile binning. The renderer 130 stores a rendering result in the frame buffer, i.e., the renderer 130 fills the tiles in the frame buffer according to the classification result. For example, assuming that a certain tile is classified to be an outside tile, the renderer 130 does not render the tile and renders a next tile. In another example, assuming that a certain tile is classified to be an inside tile, the renderer 130 uses a shader method to fill the tile. The rendering result may pass through a pixel shader or other units of a pipeline of a graphics processing unit (GPU).

Figure 7:
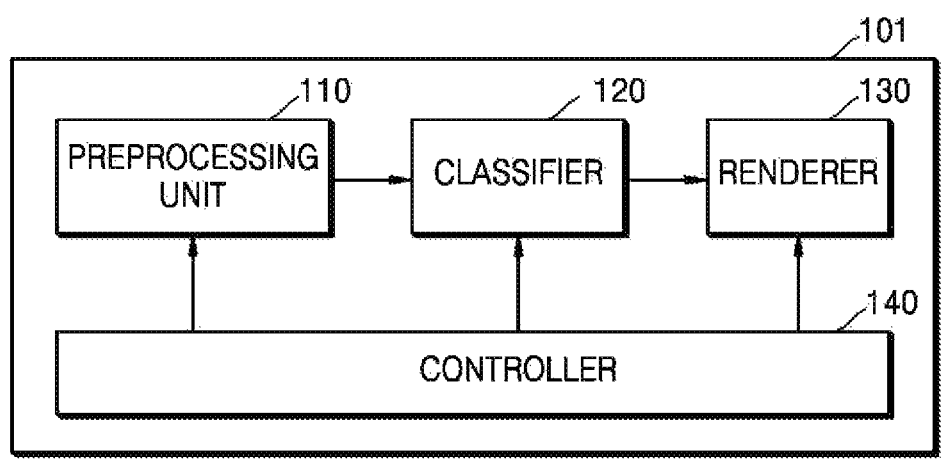
FIG. 7 is a diagram illustrating another example of a rendering apparatus.

FIG. 7 is a diagram illustrating another example of a rendering apparatus 101.

Referring to FIG. 7, the rendering apparatus 101 may include the preprocessing unit 110, the classifier 120, the renderer 130, and a controller 140. Furthermore, the rendering apparatus 101 may be embodied by a GPU.

The preprocessing unit 110 calculates parameters related to the Bezier curve. The Bezier curve may be acquired based on geometric information of an object received from the external apparatus. Furthermore, the preprocessing unit 110 calculates the bounding box 460, the convex hull 410, the Loop-Blinn parameter, the extreme point 440, or the line 450 connecting from the extreme point 440 to the base of the convex hull 410, which are described above with reference to FIG. 4. The preprocessing unit 110 may perform vertex shading and clipping before the tile binning process is performed.

The classifier 120 classifies the tiles included in a frame into any one of an inside tile, an outside tile, and a partially inside tile, based on the parameters calculated by the preprocessing unit 110. The partially inside tile signifies a tile having some endpoints located inside the Bezier curve. The classifier 120 performs a convex hull test to determine tiles having all endpoints located outside the convex hull. The classifier 120 classifies the tiles having all endpoints located outside the convex hull into an outside convex hull tile and indicates the classified tile as a first position indicia.

The classifier 120 performs the convex hull test to determine the tiles having at least one endpoint intersecting the convex hull. The classifier 120 performs the Loop-Blinn test on each of the tiles having at least one endpoint that intersects the convex hull. The classifier 120 classifies the tiles into any one of an inside tile, an outside tile, and a partially inside tile, based on a result of the Loop-Blinn test. In detail, the classifier 120 classifies the tiles having all endpoints located inside the convex hull and the Bezier curve, and indicates the classified tiles as a second position indicia. The classifier 120 classifies the tiles having all endpoints located outside the Bezier curve into outside tiles, and indicates the classified tile as a third position indicia.

The classifier 120 determines whether an x coordinate value of the extreme point of the Bezier curve is less than an intermediate control point of the Bezier curve, and whether the x coordinate value of the extreme point of the Bezier curve is less than the x coordinate values of all endpoints of the tile, and classifies the tile as an outside tile. Furthermore, the classifier 120 determines whether the x coordinate value of the extreme point of the Bezier curve is greater than the intermediate control point of the Bezier curve and whether the x coordinate value of the extreme point of the Bezier curve is greater than the x coordinate values of all endpoints of the tile, and classifies the tile as an outside tile. In addition, the classifier 120 performs a line test to classify a tile located at one side of the line connected from the extreme point of the Bezier curve to the base of the convex hull, as an outside tile.

The classifier 120 identifies tiles having some endpoints located inside the Bezier curve, based on the result of the Loop-Blinn test. The classifier 120 classifies the identified tiles as partially inside tiles, and the classified tile as a fourth position indicia. The classifier 120 divides the tile classified as the fourth position indicia into a plurality of sub-tiles, and identifies a position of each of the sub-tiles with respect to the parameters related to the Bezier curve, by using the endpoints of each of the sub-tiles. The classifier 120 classifies each of the sub-tiles into any one of an inside tile, an outside tile, and a partially inside tile.

The controller 140 receives commands to instruct the rendering apparatus 101 to render a plurality of primitives, from the external apparatus. The controller 140 decodes the received commands, and controls elements of the rendering apparatus 101 according to the received commands. In an example, the controller 140 stores information included in a command, for example, primitive or vertex information, in a memory (not shown) or a buffer (not shown), or in the elements of the rendering apparatus 101. The controller 140 controls the rendering apparatus 101 to perform the tile-based rendering in response to the received command.

The renderer 130 renders the Bezier curve that has been tile-binned. The renderer 130 performs tile-based rendering on the Bezier curve based on the classification result to render the Bezier curve that has been tile-binned. The renderer 130 generates a position indicia list corresponding to each of the tiles included in the frame, based on the classification result.

The renderer 130 identifies the classified tile as the inside tile based on the position indicia list, and performs tile-based rendering on each of fragments of the identified inside tile. In an example, the renderer 130 identifies the classified tile as an outside tile based on the position indicia list, and does not perform tile-based rendering on fragments of the identified outside tile.

The renderer 130 identifies the classified tile as the partially inside tile based on the position indicia list, and performs the Loop-Blinn test on each fragment of the partially inside tile. The renderer 130 classifies fragments as a fragment located inside the Bezier curve (hereinafter, referred to as an inside fragment) or a fragment located outside the Bezier curve (hereinafter, referred to as an outside fragment), based on the result of the Loop-Blinn test. The renderer 130 performs tile-based rendering on the partially inside tile based on the result of the classification of fragments.

The renderer 130 fills tiles according to the tile classification result. For example, when a certain tile is classified as an outside tile, the renderer 130 does not fill the tile and fills a next tile. In another example, when a certain tile is classified as an inside tile, the renderer 130 shades the tile.

While components related to the present example are illustrated in the rendering apparatuses 100 and 101 of FIGS. 1 and 7, it is understood that those skilled in the art may include other general components. Accordingly, the rendering apparatuses 100 and 101 may further include other common elements in addition to the elements illustrated in FIGS. 1 and 7. Furthermore, the rendering apparatuses 100 and 101 may include various modules or components to communicate with other hardware or software components.

Figure 8:
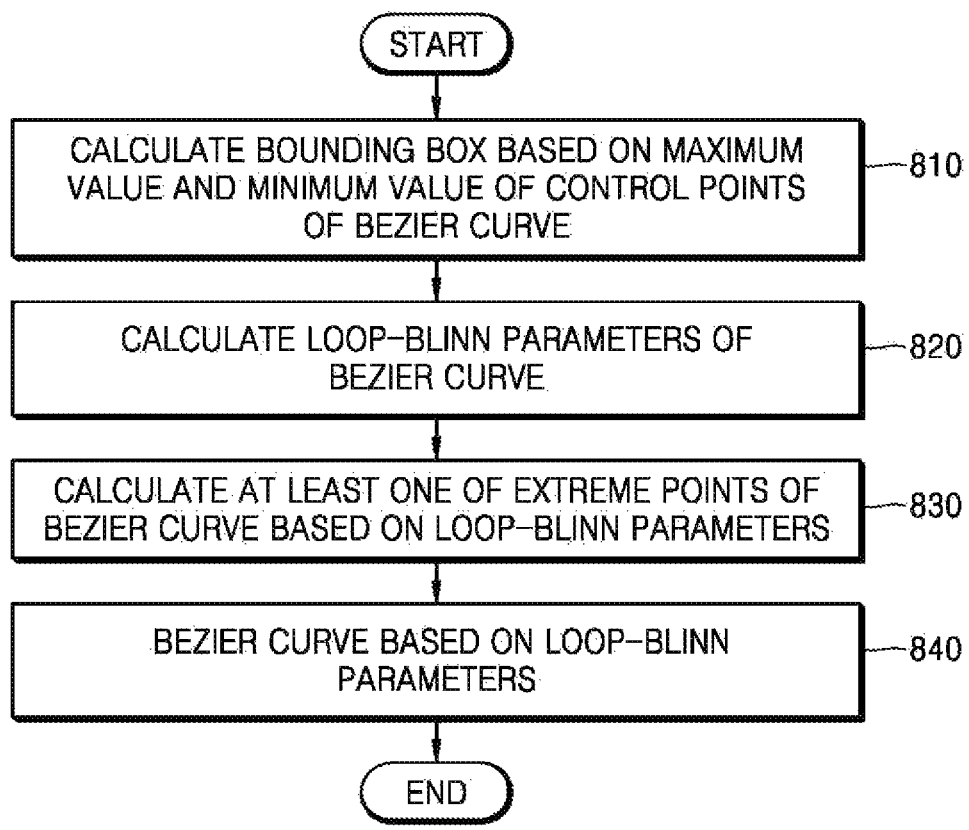
FIG. 8 is a is a diagram illustrating an example of an operation of a preprocessing unit.

FIG. 8 is a diagram illustrating an example of an operation of the preprocessing unit 110. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. The above descriptions of FIGS. 1-7, is also applicable to FIG. 8, and is incorporated herein by reference. Thus, the above description may not be repeated here.

In 810, the preprocessing unit 110 calculates a bounding box based on the maximum value and the minimum value of the control points of the Bezier curve. As described above with reference to FIG. 4, the preprocessing unit 110 may set the bounding box using a method known by those skilled in the art.

In 820, the preprocessing unit 110 calculates Loop-Blinn parameters of the Bezier curve based on a Loop-Blinn implicit function equation given by Mathematical Formula 1. In an example, the Loop-Blinn parameters of the Bezier curve may include (0,0), (0.5,0), and (1,1).

In 830, the preprocessing unit 110 calculates at least one of the extreme points of the Bezier curve based on the Loop-Blinn parameters. The preprocessing unit 110 may calculate the extreme points of the Bezier curve according to Mathematical Formula 5.

In 840, the preprocessing unit 110 calculates a line connected from the extreme points of the Bezier curve to the base of the convex hull.

Some of the operations of FIG. 8 may be executed by the classifier 120 or the renderer 130. Furthermore, the operations of FIG. 8 and other descriptions provide a basis of a control program that is executable in a microcontroller, a micro processor, or any equivalent apparatus.

Figure 9:
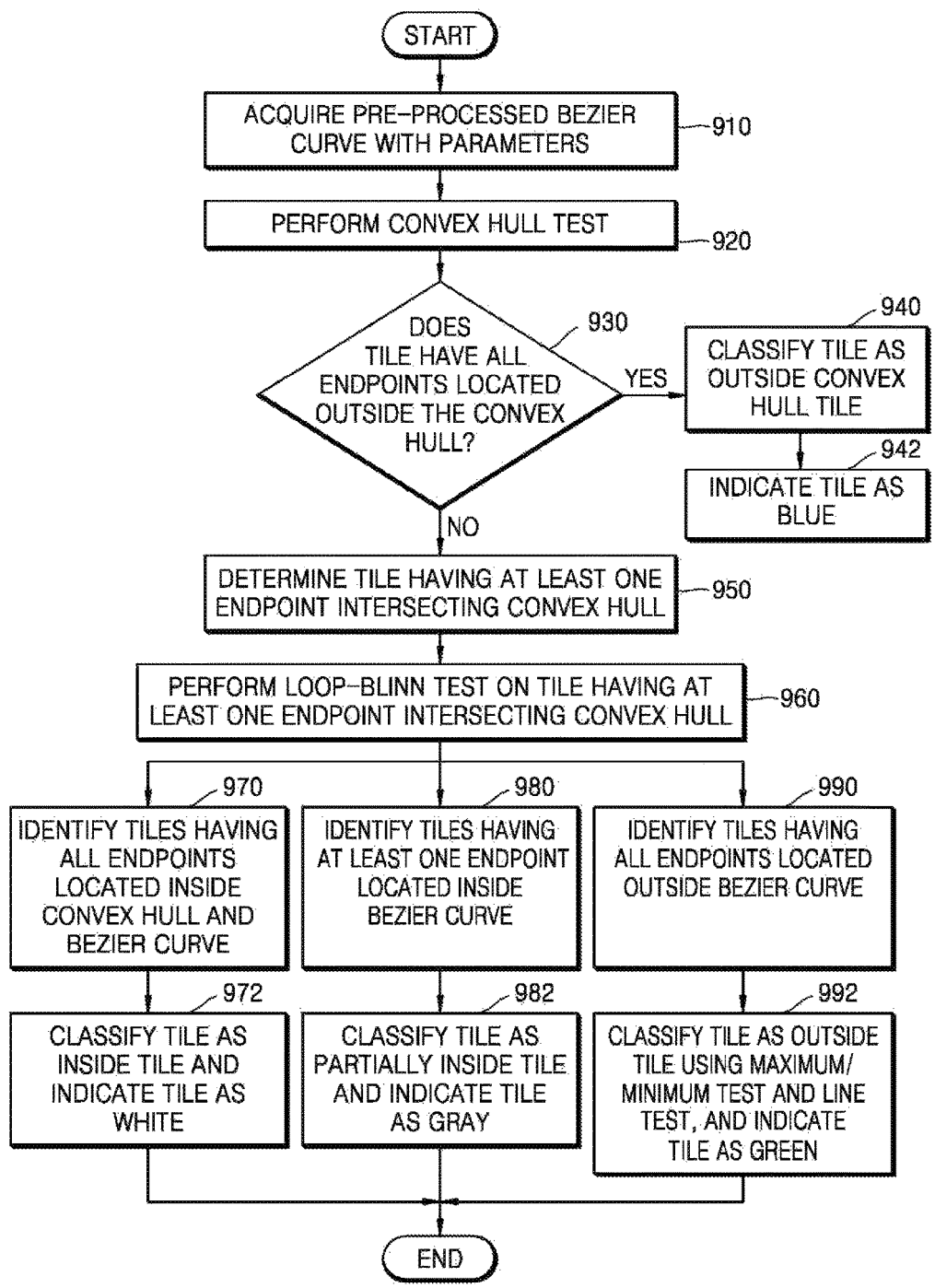
FIG. 9 is a is a diagram illustrating an example of an operation of a classifier.

FIG. 9 is a diagram illustrating an example of an operation of a classifier. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. The above descriptions of FIGS. 1-8, is also applicable to FIG. 9, and is incorporated herein by reference. Thus, the above description may not be repeated here.

In 910, the classifier 120 acquires parameters with a pre-processed Bezier curve. The parameters denote parameters calculated by the preprocessing unit 110. The parameters may include the bounding box, the convex hull, the Loop-Blinn parameter of the Bezier curve, the extreme point of the Bezier curve, or the line connected from the extreme point to the base of the convex hull. The rendering apparatus 100 uses a particular position indicia for each of the tiles in the process of performing tile-based rendering. The position indicia may include a color, a texture, or a code, but the present disclosure is not limited thereto, and may include other types of indicia known by those skilled in the art. When the pre-processed Bezier curve is acquired, the classifier 120 initially indicates each of the tiles as gray.

In 920, in order to acquire tiles located outside the convex hull and tiles intersecting the convex hull, the classifier 120 perform the convex hull test on the Bezier curve by using the convex hull. The convex hull test may be performed by using the scan line and the horizontal span. In another example, the convex hull test may be performed by using a standard box-triangle intersection test.

In 930, the classifier 120 determines whether all endpoints of a tile are located outside the convex hull based on a result of the convex hull test. In other words, the classifier 120 identifies a tile having all endpoints located outside the convex hull. When the tile having all endpoints located outside the convex hull is identified, 940 is performed. Otherwise, 950 is performed.

In 940, the classifier 120 classifies a tile having all endpoints located outside the convex hull, as an outside convex hull tile. According to an embodiment, the outside convex hull tile is indicated by the first position indicia, for example, a specific color. For example, in 942, the classifier 120 indicates the outside convex hull tiles as blue.

In 950, the classifier 120 determines a tile having at least one endpoint that intersects the convex hull. In 960, the classifier 120 performs the Loop-Blinn test on the tile determined in the 950 using Mathematical Formula 8.

$$u*u-v \quad \text{[Mathematical Formula 8]}$$

In Mathematical Formula 8, "u" and "v" denote intermediate values. The intermediate value may be acquired through interpolation of the convex hull. For example, "u" and "v" may be acquired by the barycentric interpolation method. Then, Mathematical Formula 8 is performed on an interpolated value. Various standard interpolation methods may be performed on the "u" and "v" at the endpoints of a tile using initial values.

As a result of the Loop-Blinn test, three outcomes corresponding to different categories of tiles are provided.

The first outcome of the Loop-Blinn test is tiles having all endpoints located inside the Bezier curve and the convex hull. In 970, the classifier 120 identifies tiles having all endpoints located inside the Bezier curve and the convex hull, based on the Loop-Blinn test. To this end, first, "u" and "v" values at the endpoints of a tile are determined through interpolation of the endpoints of the convex hull, that is, the endpoints of a triangle corresponding to the convex hull. Then, the Loop-Blinn test using Mathematical Formula 8 is performed. Tiles having all endpoints located inside the Bezier curve and the convex hull are identified as the inside tiles. In 972, the classifier 120 classifies the tiles having all endpoints located inside the Bezier curve and the convex hull, as the inside tiles, and indicates the tiles by the second position indicia, for example, white.

The second outcome of the Loop-Blinn test is tiles having at least one endpoint located inside the Bezier curve. Some endpoints of the tile are located inside Bezier curve and the other endpoints are located outside the Bezier curve. In 980, the classifier 120 identifies tiles having at least one endpoint located inside the Bezier curve, based on the Loop-Blinn test. In 982, the classifier 120 classifies the tiles having at least one endpoint located inside the Bezier curve tiles, as the partially inside tile, and indicates the tiles by the fourth position indicia, for example, gray.

The third outcome of the Loop-Blinn test is tiles having all endpoints located outside the Bezier curve. In 990, the classifier 120 identifies tiles having all endpoints located outside the Bezier curve, based on the Loop-Blinn test. In 992, the classifier 120 classifies the tiles having all endpoints located outside the Bezier curve, as an outside tile, using the maximum/minimum test and the line test, and indicates the tiles by the third position indicia, for example, green.

Some of the operations of FIG. 9 may be executed by the preprocessing unit 110 or the renderer 130. Furthermore, the operations of FIG. 9 and other descriptions provide a basis of a control program that is executable in a microcontroller, a micro processor, or any equivalent apparatus.

Figure 10:
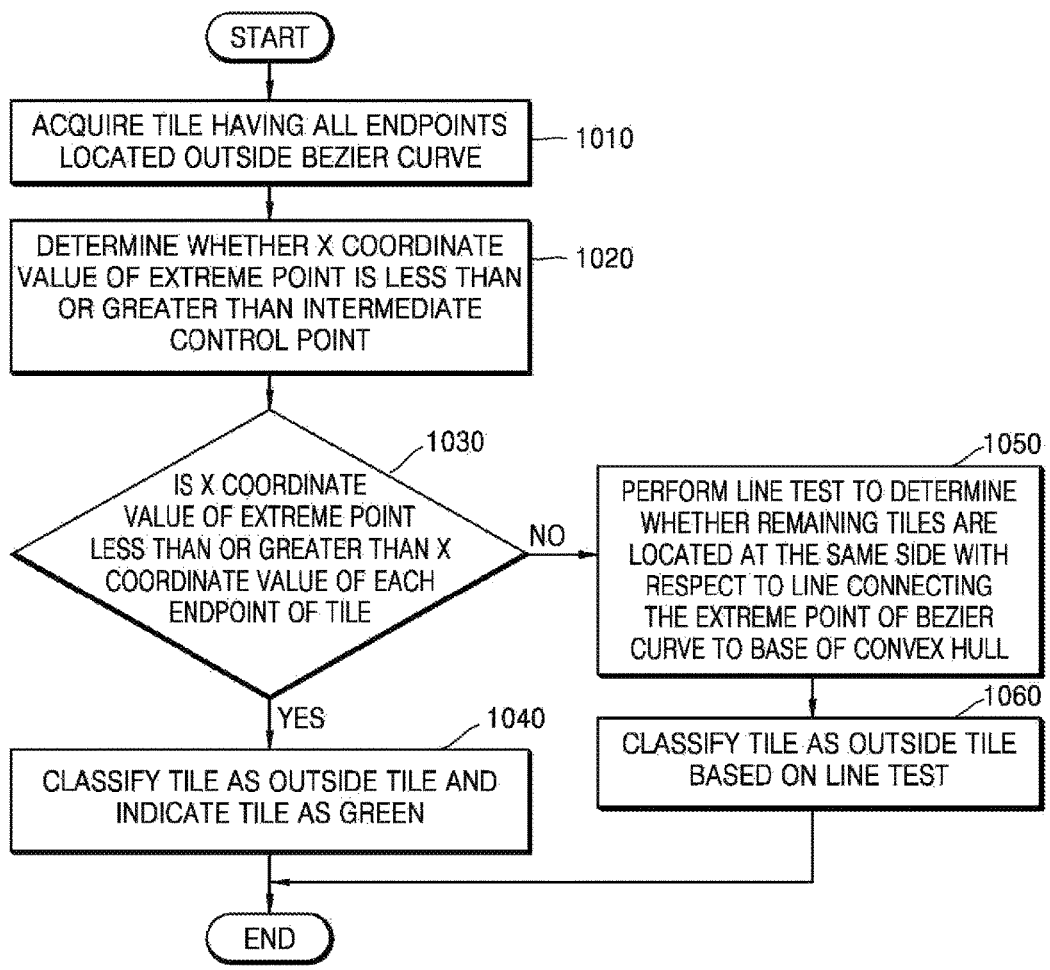
FIG. 10 is a is a diagram illustrating an example of a maximum/minimum test and a line test.

FIG. 10 is a diagram illustrating an example of the maximum/minimum test and the line test. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. The above descriptions of FIGS. 1-9, is also applicable to FIG. 10, and is incorporated herein by reference. Thus, the above description may not be repeated here.

The maximum/minimum test is performed on each of the extreme points of the Bezier curve. For example, the classifier 120 may perform the maximum/minimum test on each of x coordinates and y coordinates of the extreme points.

In 1010, the classifier 120 acquires a tile having all endpoints located outside the Bezier curve. The classifier 120 determines whether the x extremity of the Bezier curve satisfies a range that $0<t<1$. In this regard, "t" denotes a Bezier parameter. If the x extremity satisfies the range that $0<t<1$, in 1020, the classifier 120 determines whether the x coordinate value of the extreme point is less than the intermediate control point of the Bezier curve. If the x coordinate value of the extreme point is less than the intermediate control point of the Bezier curve, in 1030, the classifier 120 determines whether the x coordinate value of the extreme point is less than the x coordinate value of each endpoint of a given tile. If the x coordinate value of the extreme point is less than the x coordinate value of each endpoint of the given tile, in 1040, the classifier 120 classifies the tile as an outside tile, and indicates the tiles by the third position indicia, for example, green.

If the x coordinate value of the extreme point is greater than the intermediate control point of the Bezier curve, in 1030, the classifier 120 determines whether the x coordinate value of the extreme point is greater than the x coordinate value of each endpoint of a given tile. If the x coordinate value of the extreme point is greater than the x coordinate value of each endpoint of a given tile, in 1040, the classifier 120 classifies the tile as an outside tile and indicates the tile by the third position indicia, for example, green. As described with reference to FIG. 10, although the classifier 120 performs the above-described process, that is, the maximum/minimum test, on the x extremity of the Bezier curve, the same process may be performed on a y extremity.

If the given tile fails to pass the maximum/minimum test with respect to the extreme point of the Bezier curve, in 1050, the classifier 120 performs the line test. The classifier 120 performs the line test to determine whether the remaining tiles are located at the same side with respect to the line connecting the extreme point of the Bezier curve to the base of the convex hull. The line test is performed on the partially inside tile having all endpoints located outside the Bezier curve. The line test is performed on all tiles that are not classified yet, i.e., the remaining tiles. In 1060, the classifier 120 classifies the remaining tiles having passed the line test, as outside tiles, based on the line test, and indicates the tiles by the third position indicia, for example, green. Accordingly, as the line test is performed, additional tiles are indicated by the third position indicia Some of the operations of FIG. 10 may be executed by the preprocessing unit 110 or the renderer 130. Furthermore, the operations of FIG. 10 and other descriptions provide a basis of a control program that is executable in a microcontroller, a micro processor, or any equivalent apparatus.

Figure 11:
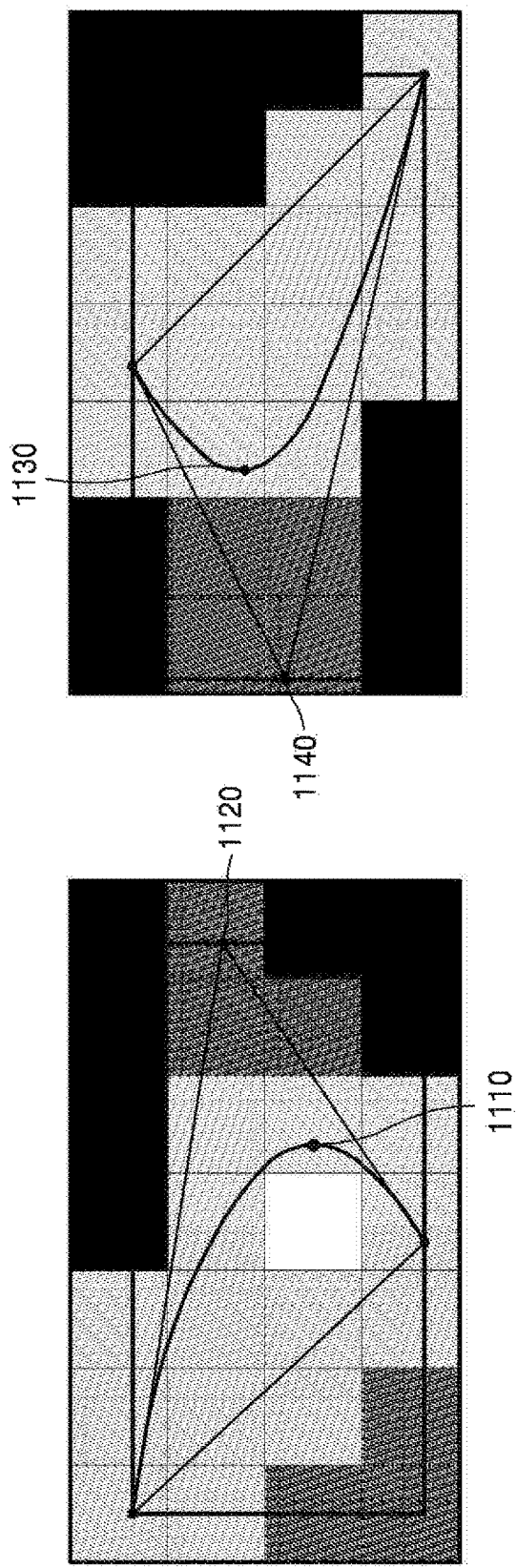
FIGS. 11A and 11B are diagrams illustrate examples of a direction of a Bezier curve in a process of performing a maximum/minimum test.

FIGS. 11A and 11B are diagrams illustrating examples of a direction of the Bezier curve in the process of performing the maximum/minimum test.

FIG. 11A illustrates a direction of a Bezier curve in which an x coordinate value of an extreme point 1110 of the Bezier curve is less than an x coordinate value of the intermediate control point 1120 of the Bezier curve. FIG. 11B illustrates a direction of a Bezier curve in which the x coordinate value of an extreme point 1130 of the Bezier curve is greater than the x coordinate value of the intermediate control point 1140 of the Bezier curve.

Figure 12:
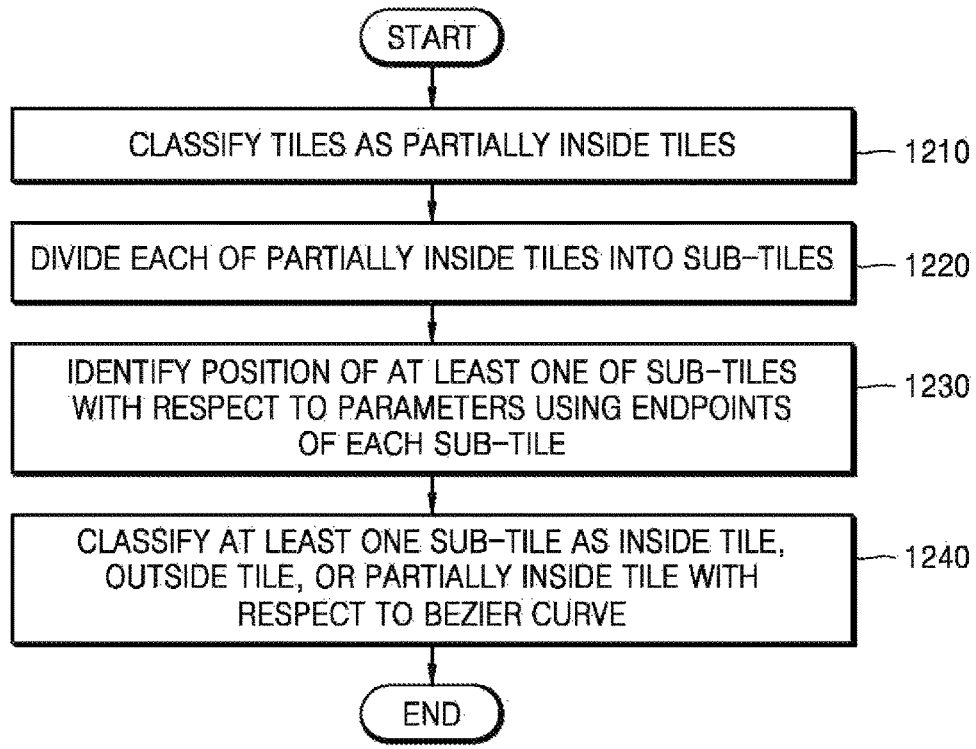
FIG. 12 is a is a diagram illustrating an example of dividing a tile by a classifier.

FIG. 12 is a diagram illustrating an example of dividing a tile by the classifier 120. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. The above descriptions of FIGS. 1-11B, is also applicable to FIG. 12, and is incorporated herein by reference. Thus, the above description may not be repeated here.

As an optimization process after binning iteration is performed, the classifier 120 performs sub-tiling on tiles classified as the partially inside tile. The sub-tiling signifies a process of dividing a tile into a plurality of sub-tiles. The rendering apparatuses 100 and 101 perform tile binning (Operation 630 of FIG. 6) on each of the sub-tiles. In an example, the classifier 120 may hierarchically divide the sub-tiles.

In 1210, the classifier 120 classifies some of tiles as partially inside tiles. The process of classifying a tile as the partially inside tile is described above with reference to FIG. 9. In 1220, the classifier 120 divides each of the partially inside tiles as a sub-tile based on memory limits. In 1230, the classifier 120 identifies a position of at least one of sub-tiles with respect to parameters of the Bezier curve, using the endpoints of each sub-tile. For example, the position of each sub-tile may be identified as any one of inside, outside, or partially inside of the Bezier curve. In 1240, the classifier 120 classifies at least one sub-tile as the inside tile, the outside tile, or the partially inside tile with respect to the Bezier curve. The classification of sub-tiles are performed using a combination of the Loop-Blinn test, the maximum/minimum test, and the line test as described above with reference to FIGS. 8 to 11.

Some of the operations of FIG. 12 may be executed by the preprocessing unit 110 or the renderer 130. Furthermore, the operations of FIG. 12 and other descriptions provide a basis of a control program that is executable in a microcontroller, a micro processor, or any equivalent apparatus.

Figure 13:
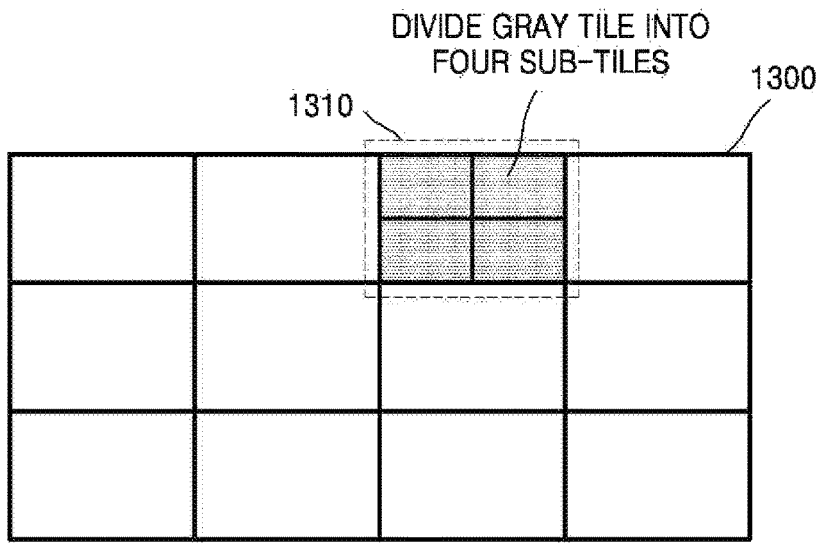
FIGS. 13 to 14B are diagrams illustrating examples of sub-tiling.
Figure 14A:
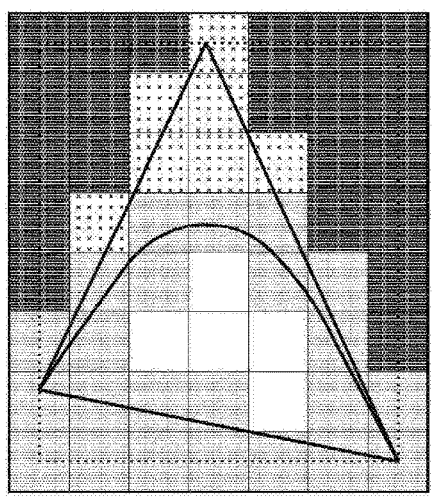
Figure 14B:
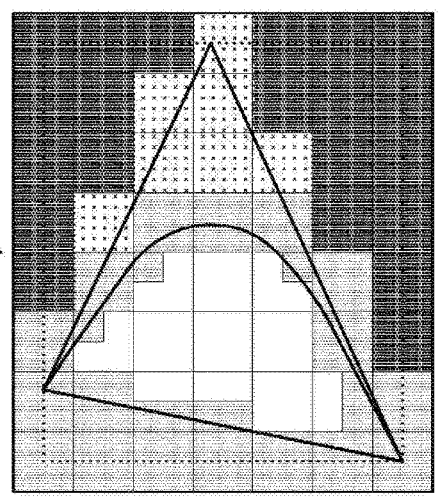

FIGS. 13 to 14B are diagrams illustrating examples of the sub-tiling.

Referring to FIG. 13, the classifier 120 may divide a tile 1310 included in a frame 1300 into four sub-tiles. FIG. 14A illustrates an example of performing tile binning, not sub-tiling. FIG. 14B illustrates an example of simultaneously performing sub-tiling and tile binning. Referring to FIGS. 14A and 14B, the classifier 120 may divide each of gray tiles into a plurality of sub-tiles, and classify each sub-tile as the inside tile or the outside tile.

Figure 15:
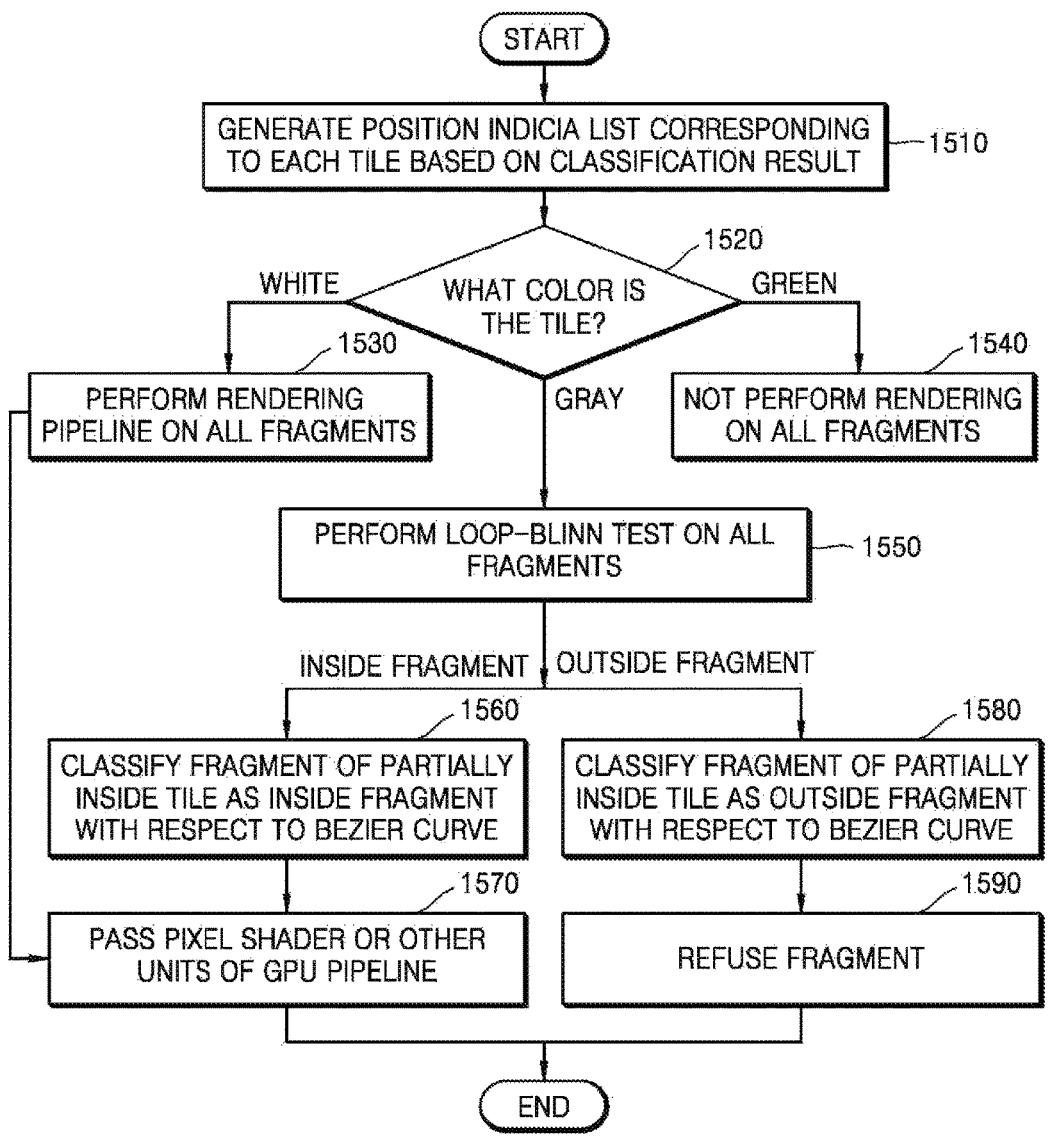
FIG. 15 is a is a diagram illustrating an example of an operation of a renderer.

FIG. 15 is a diagram illustrating an example of an operation of the renderer 130. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. The above descriptions of FIGS. 1-14B, is also applicable to FIG. 15, and is incorporated herein by reference. Thus, the above description may not be repeated here.

The rendering process after the tile binning is performed generates an effective fragment in the convex hull. If the convex hull intersects the inside tile, i.e., a tile indicated as white, fragments located inside the intersected part of the convex hull are classified as the inside fragments. Similarly, if the convex hull intersects the outside tile, i.e., a tile indicated as green, fragments located inside the intersected part of the convex hull are classified as outside fragments.

In 1510, the renderer 130 generates a position indicia list corresponding to each of the classified tiles based on the result of the classification. The classification signifies that the classifier 120 classifies tiles or sub-tiles. The position indicia list may be generated as a linear list or in a bitstream, but the present disclosure is not limited thereto. In 1520, the renderer 130 determines a color of a given tile. If the color of a given tile is white, which indicates that the tile is the inside tile with respect to the Bezier curve, in 1530, the renderer 130 declares all fragments included in the tile as the inside fragments, and performs the rendering pipeline. The rendering pipeline signifies a standard rendering process executed by the GPU that is known by those skilled in the art. Furthermore, after the operation 1530 is performed, in 1570, the renderer 130 has each of the inside fragments pass through a pixel shader or other units of a GPU rendering pipeline.

If the color of a given tile is green, which indicates that the tile is the outside tile with respect to the Bezier curve, in 1540, the renderer 130 declares all fragments included in the tile as the outside fragments, and does not perform rendering.

If the color of a given tile is gray, which indicates that the tile is the partially inside tile with respect to the Bezier curve, in 1550, the renderer 130 performs a per-fragment Loop-Blinn test on each of fragments included in the partially inside tile. As a result of the per-fragment Loop-Blinn test. If fragments of the partially inside tile pass the Loop-Blinn test, in 1560, the renderer 130 classifies the fragments as the inside fragments. In 1570, the renderer 130 has each of the inside fragments pass through a pixel shader or other units of a GPU rendering pipeline. If fragments of the partially inside tile fail to pass the Loop-Blinn test, in 1580, the renderer 130 classifies the fragments as the outside fragments. In 1590, the renderer 130 refuses the outside fragments. In other words, the renderer 130 does not perform rendering on the outside fragments. Each of the tiles classified based on the above-described classification result is filled. For example, when a given tile is classified as an outside tile, the tile is not rendered and a next tile is prepared for filling. Reversely, when a given tile is classified as the partially inside tile, a shader process is employed to fill the tile.

Some of the operations of FIG. 15 may be executed by the preprocessing unit 110 or the classifier 120. Furthermore, the operations of FIG. 15 and other descriptions provide a basis of a control program that is executable in a microcontroller, a micro processor, or any equivalent apparatus.

Figure 16:
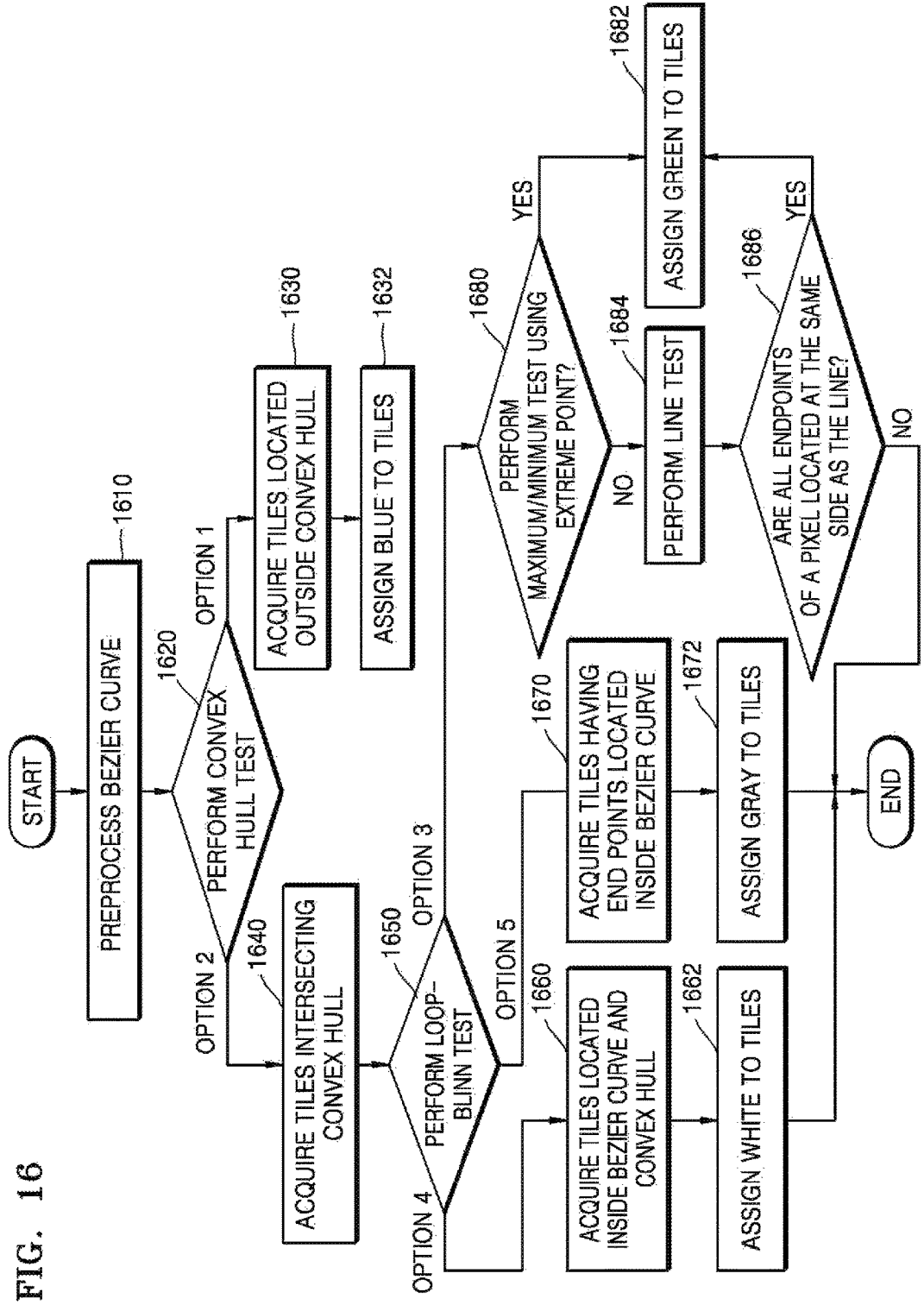
FIG. 16 is a diagram illustrating an example of performing tile-based rendering.

FIG. 16 is a diagram illustrating an example of performing tile-based rendering. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. The above descriptions of FIGS. 1-15, is also applicable to FIG. 16, and is incorporated herein by reference. Thus, the above description may not be repeated here.

In 1610, the rendering apparatuses 100 and 101 preprocess the Bezier curve. In 1620, the rendering apparatuses 100 and 101 perform the convex hull test on all tiles included in the frame buffer. As a result of the convex hull test, two outcomes are generated. The first outcome of the convex hull test corresponds to the tiles having all endpoints located outside the convex hull. In 1630, the rendering apparatuses 100 and 101 acquire tiles having all endpoints located outside the convex hull. In 1632, the rendering apparatuses 100 and 101 assign blue to the acquired tiles.

The second outcomes of the convex hull test correspond to the tiles having at least one endpoint intersecting the convex hull. In 1640, the rendering apparatuses 100 and 101 acquire at least one endpoint intersecting the convex hull. In 1650, the rendering apparatuses 100 and 101 perform the Loop-Blinn test on the acquired tiles. As a result of the Loop-Blinn test, three outcomes are generated. The first outcome of the Loop-Blinn test (Option 4 in FIG. 16) corresponds to the tiles having all endpoints located inside the Bezier curve and the convex hull. Accordingly, in 1660, the rendering apparatuses 100 and 101 acquire tiles having all endpoints located inside the Bezier curve and the convex hull. In 1662, the rendering apparatuses 100 and 101 assign white to the acquired tiles.

The second outcome of the Loop-Blinn test (Option 5 in FIG. 16) corresponds to the tiles having some endpoints located inside the Bezier curve. Accordingly, in 1670, the rendering apparatuses 100 and 101 acquire the tiles having some endpoints located inside the Bezier curve. In 1672, the rendering apparatuses 100 and 101 assign gray to the acquired tiles.

The third outcome of the Loop-Blinn test (Option 3 in FIG. 16) corresponds to the tiles having all endpoints located outside the Bezier curve. Accordingly, in 1680, the rendering apparatuses 100 and 101 performs the maximum/minimum test on the extreme points of the Bezier curve to classify the tiles having all endpoints located outside the Bezier curve as outside tiles. If a given tile passes the maximum/minimum test, in 1682, the rendering apparatuses 100 and 101 assign green to the tile. If the given tile fails to pass the maximum/minimum test, in 1684, the rendering apparatuses 100 and 101 perform the line test. If a given tile passes the line test, in 1686, the rendering apparatuses 100 and 101 assign green to the tile.

Some of the operations of FIG. 16 may be executed by the preprocessing unit 110, the classifier 120, or the renderer 130. Furthermore, the operations of FIG. 16 and other descriptions provide a basis of a control program that is executable in a microcontroller, a micro processor, or any equivalent apparatus.

FIGS. 17A to 17E are diagrams illustrating examples of performing tile-based rendering.

Referring to FIG. 17A, the rendering apparatuses 100 and 101 initially indicate all tiles as gray. Referring to FIG. 17B, the rendering apparatuses 100 and 101 performs the convex hull test to acquire tiles located outside a convex hull 1710 and tiles intersecting the convex hull 1710. The rendering apparatuses 100 and 101 indicate tiles located outside the convex hull 1710 as blue. Referring to FIG. 17C, the rendering apparatuses 100 and 101 perform the Loop-Blinn test to acquire tiles having all endpoints located inside a Bezier curve 1720 and tiles having some endpoints located inside the Bezier curve 1720. The rendering apparatuses 100 and 101 may perform the Loop-Blinn test using the above-described implicit function equation of Mathematical Formula 8. The rendering apparatuses 100 and 101 indicate the tiles having all endpoints located inside the Bezier curve 1720 as white. Referring to FIG. 17D, the rendering apparatuses 100 and 101 performs the maximum/minimum test on an extreme point 1730 to acquire tiles having all endpoints locates outside the Bezier curve 1720. The rendering apparatuses 100 and 101 indicate the tiles having all endpoints located outside the Bezier curve 1720 as green. There may be a case in which all endpoints are located outside the Bezier curve 1720 or the extreme point 1730 is located in the middle of a tile. In this case, the rendering apparatuses 100 and 101 do not classify the tile as an outside tile and perform an appropriate test to identify whether the tile is an inside tile, an outside tile, or a partially inside tile. Referring to FIG. 17E, the rendering apparatuses 100 and 101 perform the line test on gray tiles having all endpoints located outside the Bezier curve 1720. The line test is performed to determine whether the remaining tiles are located at the same side with respect to a ling 1740 connected from the extreme point 1720 to a base of the convex hull 1710. If the remaining tiles are located at the same side with respect to the line 1740, the rendering apparatuses 100 and 101 indicate the tiles as green. In order to check at which side of the line 1740 a point exist, points formed by two points on the line 1740 and a signed area of a point to be checked are determined by using a method that is known by those skilled in the art. Accordingly, after the line test is performed, additional tiles may be indicated as green.

Figure 18:
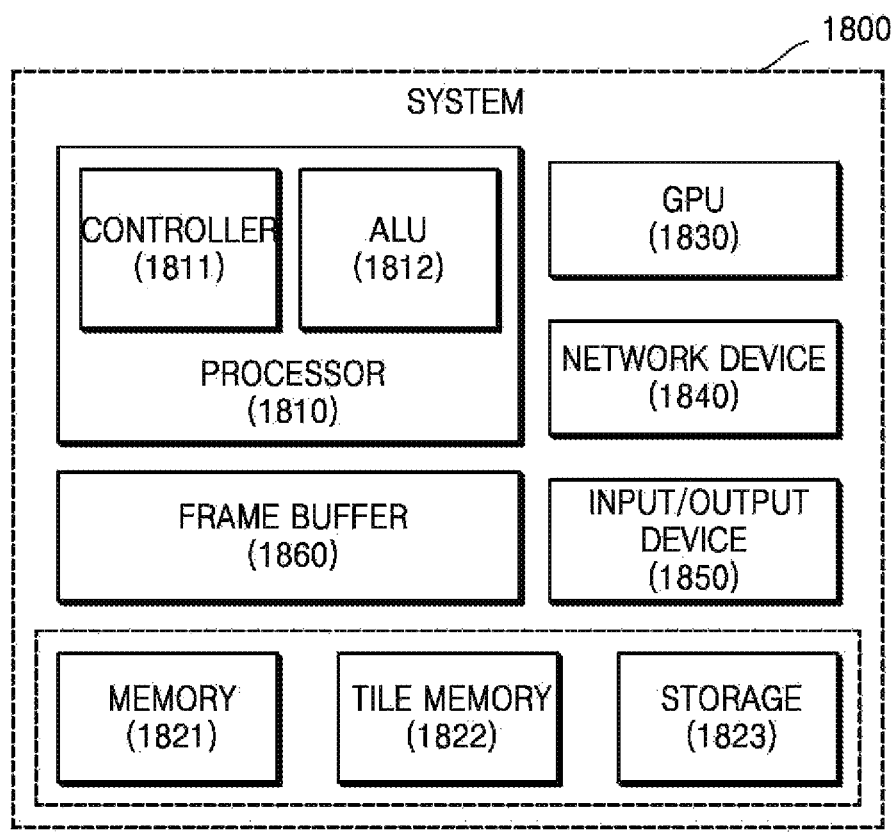
FIG. 18 is a diagram illustrating an example of a computing system.

FIG. 18 is a diagram illustrating an example of a structure of a computing system 1800.

Referring to FIG. 18, in an example, the computing system 1800 includes at least one processor 1810, a memory 1821, a tile memory 1822, a storage 1823, a GPU 1830, a plurality of network devices 1840, a plurality of input/output devices 1850, and a frame buffer 1860. The processor 1810 includes a controller 1811 and an arithmetic logic unit (ALU) 1812. The computing system 1800 may include other functional components that are not illustrated in FIG. 18.

The processor 1810 processes commands related to the method described herein. The processor 1810 receives commands from the controller 1811 to execute the commands. Furthermore, the processor 1810 performs logical and arithmetical operations related to the execution of the commands with the help of the ALU 1812. The commands and codes required to operate the processor 1810 may be stored in the memory 1821, the storage 1823, or both the memory 1821 and the storage 1823. The commands and codes area read from the memory 1821 and/or the storage 1823 and executed by the processor 1810. The processor 1810 may denote a type of a computational circuit, such as, for example, a microprocessor, a microcontroller, a complex instruction set computing (CISC) microprocessor, a reduced instruction set computing (RISC) microprocessor, a very long instruction word (VLIW) microprocessor, an explicitly parallel instruction computing (EPIC) microprocessor, a graphic processor, a digital signal processor, or a processing circuit of a different type. The processor 1810 may include general or program operable logic devices or arrays, application specific integrated circuits, single chip computers, or embedded controller such as smart cards.

The memory 1821 may be a volatile memory or a non-volatile memory. A variety of computer-readable storage media may be stored in and accessed from elements of the memory 1821. The memory elements may include appropriate memory devices for storing data and computer-readable commands, such as, read only memory (ROM), random access memory (RAM), erasable programmable read only memory (EP-ROM), electrically erasable programmable read only memory (EEP-ROM), a hard drive, a movable media drive, for example, compact discs, digital video disc, diskettes, magnetic tape cartridges, memory cards, etc.

The tile memory 1822 indicates particular tiles that belong to a graphic image during the tile binning. The tile memory 1822 may be a part of the storage 1823, but the present disclosure is not limited thereto. The tile memory 1822 stores pixel values for each of the processed tiles. Furthermore, the tile memory 1822 stores tile sizes, and outcomes of the respective tests performing during the tile binning.

The storage 1823 stores parameters calculated while the curve pre-processing is performed. The storage 1823 may include appropriate memory devices for storing data and computer-readable commands, such as, read only memory (ROM), random access memory (RAM), erasable programmable read only memory (EP-ROM), electrically erasable programmable read only memory (EEP-ROM), a hard drive, a movable media drive, for example, compact discs, digital video disc, diskettes, magnetic tape cartridges, memory cards, etc.

The GPU 1830 may be embodied by the rendering apparatus 100 of FIG. 1 or the rendering apparatus 101 of FIG. 7. The GPU 1830 performs tile-based rendering for rendering the tile-binned Bezier curve. The GPU 1830 calculates parameters related to the Bezier curve and classifies tiles included in a frame into any one of an inside tile, an outside tile, and a partially inside tile with respect to the Bezier curve, based on the calculated parameters. Furthermore, the GPU 1830 performs tile-based rendering of the Bezier curve, based on a result of the classification.

The frame buffer 1860 stores rendering information. In an example, the frame buffer 1860 stores pixel values of a graphic image. The size of the frame buffer 1860 is proportional to the number of necessary pixel positions.

The rendering apparatuses 100 and 101 may be stored in the above-described storage medium in the form of computer-readable commands and may be executed by the processor 1810. For example, a computer program may include computer-readable commands to operate the processor 1810 so that the tile-based rendering process to render the tile-binned Bezier curve may be performed. The computer program may be stored in a compact disk-read only memory (CD-ROM) and may be loaded on a hard drive in the non-volatile memory from the CD-ROM The network devices 1840 or the input/output devices 1850 may be connected to the computing system 1800 via a networking unit and an input/output device unit.

The GPU 1830 may render cubic curves when the cubic curves are decomposed to obtain a plurality of quadratic Bezier curves.

As described above, the rendering apparatuses 100 and 101 may reduce computational power consumed to render the Bezier curve.

The apparatuses, units, modules, devices, and other components illustrated that perform the operations described herein with respect to FIGS. 1, 7, and 18 are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 6, 8-10, 12, and 15-16 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing tile-based rendering, the method comprising:
   calculating, using geometric information of an object, parameters related to a Bezier curve in the object;
   classifying tiles included in a frame based on the parameters; and
   performing the tile-based rendering based on the classifying of the tiles,
   wherein the classifying of the tiles comprises:
   determining tiles having some endpoints corresponding to corners of the tile located inside a convex hull corresponding to the Bezier curve;
   performing a Loop-Blinn test on each of the determined tile; and
   classifying the determined tiles based on the Loop-Blinn test.

2. The method of claim 1, wherein the parameters comprise at least one of a bounding box, a convex hall, Loop-Blinn data corresponding to the Bezier curve, and an extreme point corresponding to the Bezier curve, or a line connected from the extreme point to the convex hull.

3. The method of claim 2, wherein the classifying of the tiles comprises classifying as a first position indicia at least one tile included in the frame having all endpoints corresponding to corners of the tile located outside a convex hull corresponding to the Bezier curve.

4. The method of claim 1, wherein the classifying of the determined tiles comprises:
   identifying, based on the Loop-Blinn test, at least one tile having all endpoints located inside the convex hull and the Bezier curve; and
   classifying the identified at least one tile as a second position indicia.

5. The method of claim 1, wherein the classifying of the determined tiles comprises:
   identifying, based on the Loop-Blinn test, at least one tile having all endpoints located outside the Bezier curve; and
   classifying the identified at least one tile as a third position indicia.

6. The method of claim 5, wherein the identifying of the at least one tile comprises identifying the at least one tile in which an x coordinate value of an extreme point of the Bezier curve is less than an intermediate control point of the Bezier curve and x coordinate values of the endpoints corresponding to corners of the tile.

7. The method of claim 5, wherein the identifying of the at least one tile comprises identifying the at least one tile in which an x coordinate value of an extreme point of the Bezier curve is greater than an intermediate control point of the Bezier curve and x coordinate values of the endpoints corresponding to corners of the tile.

8. The method of claim 5, wherein, the identifying of the at least one tile comprises identifying at least one tile located at one side of a line connected from an extreme point of the Bezier curve to the convex hull.

9. The method of claim 1, wherein the classifying of the determined tiles comprises:
identifying, based on the Loop-Blinn test, tiles having some endpoints corresponding to the corners of the tile located inside the Bezier curve;
classifying the identified at least one tile as a fourth position indicia;
dividing the tile classified as the fourth position indicia into a plurality of sub-tiles; and
classifying the sub-tiles using endpoints corresponding to corners of each of the sub-tiles.

10. The method of claim 1, wherein the performing of the tile-based rendering comprises generating a position indicia list corresponding to each of the tiles included in the frame based on the classifying of the tiles.

11. The method of claim 1, wherein the performing of the tile-based rendering comprises:
identifying a tile located inside the Bezier curve based on a position indicia list corresponding to each of the tiles comprising the frame; and
performing the tile-based rendering on each fragment of the identified tile.

12. The method of clam 1, wherein the performing of the tile-based rendering comprises:
identifying a tile located outside the Bezier curve based on a position indicia list corresponding to each of the tiles comprising the frame; and
excluding performance of the tile-based rendering on fragments of the identified tile.

13. The method of claim 1, wherein the performing of the tile-based rendering comprises:
identifying a tile located partially inside the Bezier curie based on a position indicia list corresponding to each of the tiles comprising the frame;
performing a Loop-Blinn test on each fragment of the identified tile;
classifying the fragments located inside the Bezier curve and fragments located outside the Bezier curve based on the Loop-Blinn test; and
performing the tile-based rendering on the identified tile based the classifying of the fragments.

14. A non-transitory computer-readable storage medium comprising a program to cause a computer to perform the method of claim 1.

15. An apparatus for performing tile-based rendering, the apparatus comprising:
a preprocessing circuit configured to calculate parameters related to a Bezier curve in an object, using geometric information of the object;
a classifier circuit configured to classify tiles included in a frame, based on the parameters; and
a renderer circuit configured to perform the tile-based rendering based on the classifying of the tiles,
wherein the classifier circuit is further configured to determine tiles having some endpoints corresponding to corners of the tile located inside a convex hull corresponding to the Bezier curve, to perform a Loop-Blinn test on each of the determined tiles, and to classify the determined tiles based on the Loop-Blinn test.

16. The apparatus of claim 15, wherein the parameters comprise at least one of a bounding box, a convex hull, Loop-Blinn data corresponding to the Bezier curve, and an extreme point corresponding to the Bezier curve, or a line connected from the extreme point to the convex hull.

17. The apparatus of claim 15, wherein the classifier circuit is further configured to classify as a first position indicia at least one tile included in the frame having all endpoints corresponding to corners attic tile located outside a convex hull corresponding to the Bezier curve.

18. The apparatus of claim 15, wherein the classifier circuit is further configured to identify, based on the result of the Loop-Blinn test, at least one tile having all endpoints located inside the convex hull and the Bezier curve and to classify the identified at least one tile as a second position indicia.

19. The apparatus of claim 15, Wherein the classifier circuit is further configured to identify, based on the result of the Loop-Bilinn test, at least one tile having all endpoints located outside the Bezier curve, and to classify the identified at least one tile as a third position indicia.

20. The apparatus of claim 19, wherein the classifier circuit is further configured to identify at least one tile in which an x coordinate value of an extreme point of the Bezier curve is less than an intermediate control point of the Bezier curve and x coordinate values of the endpoints corresponding to corners of the tile.

21. The apparatus of claim 19, wherein the classifier circuit is further configured to identify at least one tile in which an x coordinate value of an extreme point of the Bezier curve is greater than an intermediate control point of the Bezier curve and x coordinate values of the endpoints corresponding to corners of the tile.

22. The apparatus of claim 19, wherein the classifier circuit is further configured to identify at least one tile located at one side of a line connected from an extreme point of the Bezier curve to the convex hull.

23. The apparatus of claim 15, wherein the classifier circuit is further configured to:
identify, based on the result of the Loop-Blinn test, tiles having some endpoints corresponding to the corners of the tile located inside the Bezier curve;
classify the identified at least one tile as a fourth position indicia;
divide the tile classified as the fourth position indicia into a plurality of sub-tiles; and
classify the sub-tiles using endpoints corresponding to corners of each of the sub-tiles.

24. The apparatus of claim 15, wherein the renderer circuit is further configured to generates a position indicia list corresponding to each of the tiles included in the frame based on the classifying of the tiles.

25. The apparatus of claim 15, wherein the renderer circuit is further configured to identify a tile located inside the Bezier curve based on a position indicia list corresponding to each of the tiles comprising the frame, and to perform the tile-based rendering on each of fragments of the identified tile.

26. The apparatus of claim 15, wherein the renderer circuit is further configured to identify a tile located outside the Bezier curve based on a position indicia list corresponding to each of the tiles comprising the frame, and to exclude performance of the tile-based rendering on fragments of the identified tile.

27. The apparatus of claim 15, wherein the renderer circuit is further configured to identify a tile located partially inside the Bezier curve based on a position indicia list corresponding to each of the tiles included in the frame, to perform a Loop-Blinn test on each of fragments of the identified tile, to classify the fragments into fragments located inside the Bezier curve or fragments located outside the Bezier curve, based on the Loop-Blinn test, and to perform the tile-based rendering on the identified tile based on the classifying of the fragments.

28. The apparatus of claim 15, the apparatus comprising a graphics processing unit (GPU).

29. A method of performing tile-based rendering, the method comprising:
    receiving parameters related to a Bezier curve of an object;
    determining whether all endpoints of tiles included in a frame are located outside a convex hull corresponding to the Bezier curve;
    exclude rendering of fragments in a tile, in response to all endpoints of the tile being located outside the convex hull;
    performing a Loop-Blinn test on the tile in response to at least one endpoint of the tile intersecting the convex hull;
    classifying the tile as an inside tile, in response to identifying the tile having all endpoint located inside the convex hull and the Bezier curve; and
    performing the tile-based rendering on each of fragments of the inside tile.

30. A method of performing tile-based rendering, the method comprising:
    receiving parameters related to a Bezier curve of an object;
    determining whether all endpoint of tiles included in a frame are located outside a convex hull corresponding to the Bezier curve;
    exclude rendering of fragments in a tile, in response to all endpoints of the tile being located outside the convex hull;
    performing a Loop-Blinn test on the tile in response to at least one endpoint of the tile intersecting the convex hull;
    dividing a tile into sub-tiles, in response to identifying the tile having some endpoints located inside the Bezier curve; and
    classifying each sub-tile from the sub-tiles as one of inside, outside, or the partially inside the Bezier curve.

* * * * *